(12) United States Patent
Matovina et al.

(10) Patent No.: US 9,398,668 B2
(45) Date of Patent: Jul. 19, 2016

(54) SYSTEM AND METHOD FOR PROVIDING ALTERNATIVE COMMUNICATION PATH FOR MANAGEMENT OF LIGHTING NETWORK ELEMENTS

(71) Applicant: KONINKLIJKE PHILIPS N.V., Eindhoven (NL)

(72) Inventors: Jelena Matovina, Eindhoven (NL); Oscar Jan Deurloo, Eindhoven (NL); Johan Wilhelmus Hermanus Kuppen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/413,368

(22) PCT Filed: Jul. 9, 2013

(86) PCT No.: PCT/IB2013/055630
§ 371 (c)(1),
(2) Date: Jan. 7, 2015

(87) PCT Pub. No.: WO2014/009880
PCT Pub. Date: Jan. 16, 2014

(65) Prior Publication Data
US 2015/0257240 A1  Sep. 10, 2015

Related U.S. Application Data

(60) Provisional application No. 61/669,891, filed on Jul. 10, 2012.

(51) Int. Cl.
*H05B 37/02* (2006.01)
*G05B 15/02* (2006.01)
*H05B 33/08* (2006.01)

(52) U.S. Cl.
CPC ............ *H05B 37/0245* (2013.01); *G05B 15/02* (2013.01); *H05B 37/029* (2013.01);
(Continued)

(58) Field of Classification Search
CPC ........... H05B 37/0245; H05B 37/0254; H05B 37/0263; H05B 37/0272
USPC .................. 315/247, 185 S, 209 R, 291–326
See application file for complete search history.

(56) References Cited

U.S. PATENT DOCUMENTS

2006/0058002 A1  3/2006  Bachelder
2007/0080820 A1  4/2007  Markstaler
(Continued)

FOREIGN PATENT DOCUMENTS

CN        2638389 Y     9/2004
CN      101065996 A    10/2007
(Continued)

*Primary Examiner* — Tuyet Vo

(57) ABSTRACT

This invention discloses an alternative communication and control path that can by-pass a primary communication and control line in the control luminaires of an illumination network luminaires. By creating the alternative back-up path, it is possible to still communicate and control network elements in cases when the primary communication and control path is unavailable or when direct control of individual or a plurality of luminaires is desired. In one aspect of the invention, this alternative path may provide for a direct interface for demand response utility programs for specialized control of the luminaires of the illumination network.

15 Claims, 5 Drawing Sheets

(52) U.S. Cl.
CPC ........ *H05B37/0254* (2013.01); *H05B 37/0263* (2013.01); *H05B 37/0272* (2013.01); *H05B 33/0815* (2013.01); *Y02B 20/72* (2013.01)

(56) References Cited

U.S. PATENT DOCUMENTS

| | | | |
|---|---|---|---|
| 2007/0268680 A1 | 11/2007 | Lee | |
| 2009/0190502 A1* | 7/2009 | Mameda | H04W 76/027 370/255 |
| 2011/0001626 A1 | 1/2011 | Yip | |
| 2011/0140611 A1 | 6/2011 | Elek | |
| 2011/0215732 A1 | 9/2011 | Chen | |
| 2011/0288658 A1 | 11/2011 | Walters | |

FOREIGN PATENT DOCUMENTS

| | | |
|---|---|---|
| CN | 101336024 A | 12/2008 |
| CN | 101389172 A | 3/2009 |
| CN | 201878386 U | 6/2011 |
| JP | 2005129365 A | 5/2005 |
| JP | 2007287681 A | 11/2007 |
| WO | 9729560 A1 | 8/1997 |

* cited by examiner

US 9,398,668 B2

SYSTEM AND METHOD FOR PROVIDING ALTERNATIVE COMMUNICATION PATH FOR MANAGEMENT OF LIGHTING NETWORK ELEMENTS

CROSS-REFERENCE TO PRIOR APPLICATIONS

This application is the U.S. National Phase application under 35 U.S.C. §371 of International Application No. PCT/IB2013/055630, filed on Jul. 9, 2013, which claims the benefit of U.S. Provisional Patent Application No. 61/669,891, filed on Jul. 10, 2012. These applications are hereby incorporated by reference herein.

This application is related to the field of lighting network management systems, and more particularly to a system to provide reliable communications with lighting network systems.

Lighting is usually managed from one centralized point that can be referred to as a central management system. A challenging question is to define "Central Management System" (CMS) in the context of a lighting installation (outdoor and/or indoor lighting networks). Perhaps a CMS is best characterized as a communication system for providing 'Monitoring', 'Reporting' and 'Control' of lighting (e.g., street lighting and/or indoor lighting). The exact hardware and software required to implement a CMS varies between the different approaches adopted by the various manufacturers producing CMS today.

Currently, several ways for communicating and controlling outdoor and indoor luminaires are available. Networks for communication and control may be wired or wireless. For example, power line and RF communication systems are methods for controlling luminaires in a network. For example, the Starsense system, manufactured by the assignee of the instant application, is a telemanagement system with remote control of outdoor light points (elements) on highways, roads, streets, and in residential areas. The Starsense products save energy by enabling individual light points to be switched on or off at any given time or set to any dimming level. Although, the Starsense system is here used as an example of an outdoor lighting system, it would be recognized by those skilled in the art that the invention disclosed herein is also applicable to other types of outdoor and indoor lighting systems with wired or wireless communication and control paths for lighting system behavior management.

However, central management of outdoor (or indoor) luminaries over a primary network may, in certain situations, be impractical (e.g., disrupted, blocked, non-etc.) as local conditions may require different (easier, back-up . . . ) settings.

In addition, local control of the luminaries may be required to satisfy certain imposed requirements. For example, local control may be implemented with a demand response (DR) operation. Demand response operations can be defined as a set of initiatives that allows electric energy customers to change their electricity usage for a certain period of time due to receiving a price signal from the utility.

In addition, communication with, and control of, luminaires in an outdoor or an indoor system, may be interrupted when a primary communication and control path is not available or not applicable at certain periods.

Hence there is a need for an alternative communication/control path (for the utilities) to the luminaire or to other system components or systems, e.g., police, fire, traffic management, etc., to provide control of the devices in the systems when the primary communication path is not functional. In addition, the alternative communication/control path may enable subsidies and incentives, increase energy savings, and meet different set/agreed/needed/enforced targets.

In one aspect of the invention, a method for controlling an element of a network is disclosed. The method comprises monitoring a primary communication system, monitoring an alternative communication system, receiving a command from at least one of the primary communication system and the alternative communication system, prioritizing the received commands and executing an application in response to the received command, the application controlling the operations of the network element.

In another aspect of the invention, a device for controlling an element of a network comprising a plurality of elements is disclosed. The device comprises a processor in communication with a memory, the memory including code which when accessed by the processor, causes the processor to monitor a primary communication network, monitor an alternative communication network, receive a command from the primary communication system and/or from the alternative communication networks, prioritize the received commands and execute an application in response to the received command, the application controlling the operations of the network element.

The advantages, nature, and various additional features of the invention will more fully upon consideration of the illustrative embodiments to be described in detail in connection with accompanying drawings wherein like reference numerals are used to identify like element throughout the drawings.

It is to be understood that the figures and descriptions of the present invention described herein have been simplified to illustrate the elements that are relevant for a clear understanding of the present invention, while eliminating, for purposes of clarity many other elements. However, because these elements are well-known in the art, and because they do not facilitate a better understanding of the present invention, a discussion of such element is not provided herein. The disclosure herein is directed to also variations and modifications known to those skilled in the art.

Figure 1:
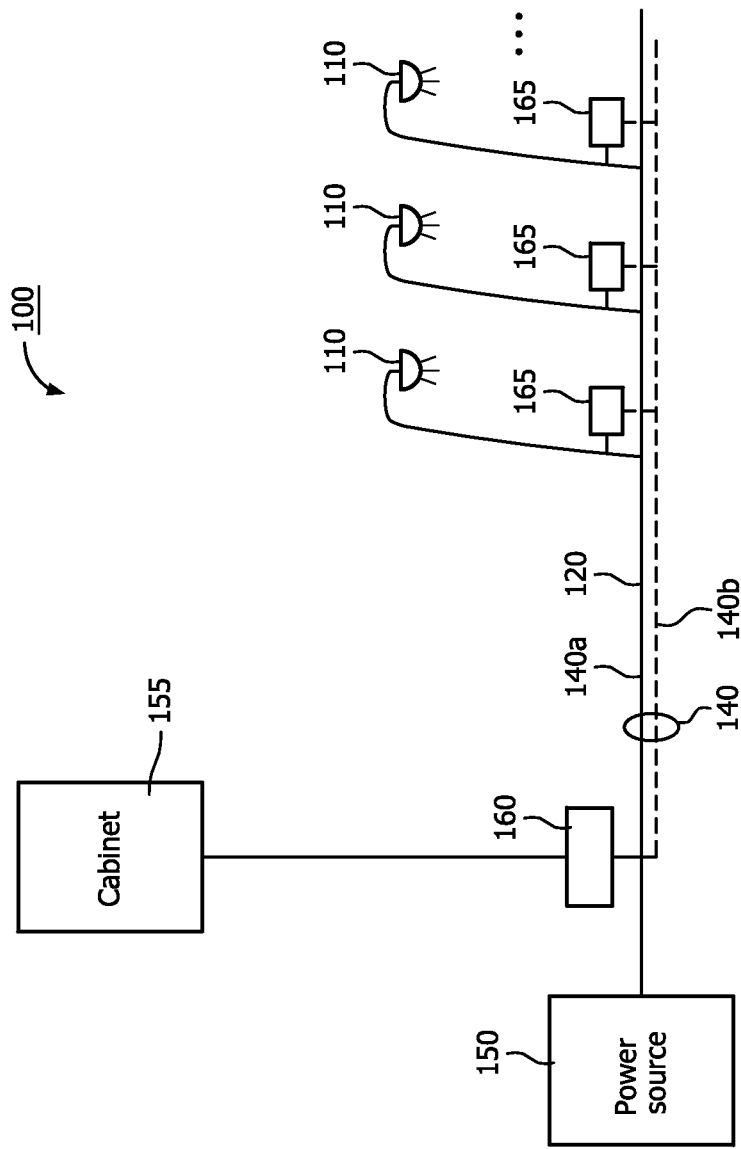
FIG. 1 represents an exemplary illumination system configuration.

FIG. 1 represents an exemplary illumination system 100 including a plurality of outdoor luminaries, 110, wherein each of the illustrated luminaries 110 is connected through a power grid (network) 120. In the exemplary power grid (network) 120 shown, the luminaries 110 are connected in a serial manner FIG. 1 is one example how an outdoor lighting network can be connected, controlled and/or communicated with the luminaries 110 (network elements) through a-power grid 120 that supplies power to the luminaries 110 from power source 150. In addition, a primary communication network 140 provides control signals to each of the illustrated luminaries 110. In the illustrated in FIG. 1, the primary communication network 140 may be incorporated into the power grid 120, wherein the lines 140a represent the power lines that provide power the luminaries 110 and the lines 140b represent the (same) power lines that provide signals to the luminaries 110. It would be recognized that lines 140a and 140b are logic representations of the physical lines of power grid 120 upon which both power and (information) are implemented. The control (or information) signals may be used to turn the luminaries 110 on or off or to dim the luminaires to conserve power. Providing communication and/or control (or information) signals over a power line network 120 is well known in the art and need not be discussed in detail herein.

In other systems, the primary communication network 140 may be totally independent of the power grid 120 and may be a wired or a wireless system. For example, a wire-ed primary communication network 140 may be one of a public network (e.g., internet) or a private network. Similarly, a wireless primary communication network 140 may be a local area network (LAN) or a wide area network (WAN) than may be public or private. In each case, the luminaries 110 include components that accept the communication provided through the primary communication network 140.

In controlling the luminaries, an electronic cabinet (or a segment controller that is not in the cabinet form) 155 may provide control signals (or information) over the primary communication network 140 (which may or may not be the same as the power grid 120) to each luminaire 110. Each luminaire 110 may include an electronic interface device 165 that monitors the signals transmitted over primary communication network 140. When command signals are detected on the primary communication network 140, the electronic interface device 165 provides the appropriate signals to alter the state of the corresponding luminaire 110.

Figure 2A:
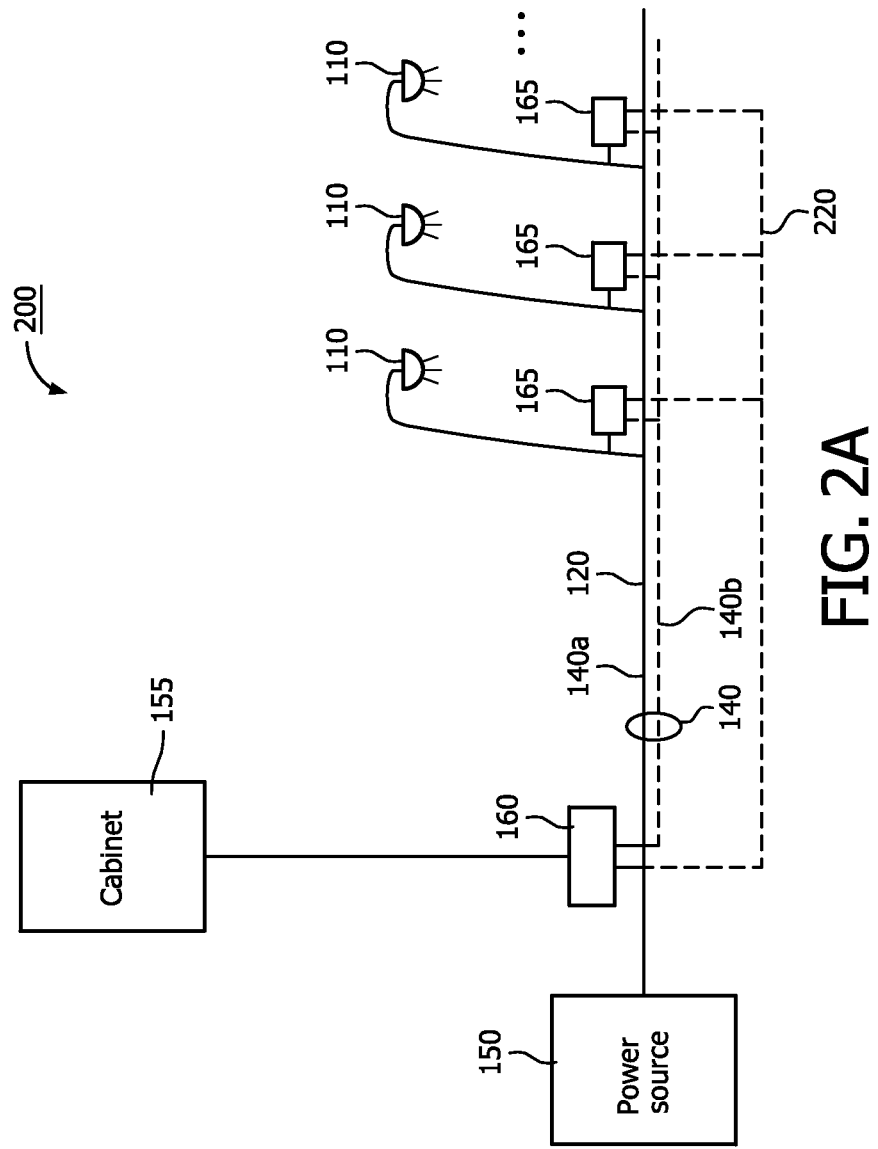
FIG. 2A represents an exemplary illumination system configuration in accordance with the principles of the invention.

FIG. 2A illustrates an exemplary network configuration 200 in accordance with the principles of the invention. In this exemplary network, the luminaries 110 are connected through the power grid 120 (for delivering energy to the luminaries), as previously discussed, and operate as discussed with regard to FIG. 1. In addition, the primary communication network 140 is represented as being comparable to the power 120, wherein control signals are provided over the physical lines of power grid 120. In addition, an alternative (secondary) network 220 provides an alternative path for communication to each of the luminaries 110.

In the illustrated example, the alternative network 220 is a wired network that operates independent of the power grid 120 and the primary communication network 140.

The wire-ed alternative network 220, illustrated, may be a dedicated network that provides control signals to each luminaire 110. In the illustrated network configuration, control signals are provided from a cabinet 155, through interface 160, to both the primary communication network 140 and the alternative network 220. Interface 160 may provide control signals to each network 140 and 220, individually or in combination. The interface device 165, corresponding to the luminaries 110, monitors both networks (140 and 220) to determine whether control signals are present on either network 140 or 220 to control the operation of the corresponding luminaire 110. In one aspect of the invention, a wire-ed alternative communication network 220 may be one of a public network (e.g., internet) or a private network. Although interface device 165 is illustrated located on corresponding luminaries 110, it would be recognized that interface device 165 may be located at corresponding luminaires (i.e., integrated with the luminary electronic circuitry) or may be located in cabinet (segment controller) 155. Hence, interface device 165 may be integrated/non-integrated with the luminaire or integrated/non-integrated with the communication module 160 or integrated/non-integrated with the cabinet 155. The exact placement of interface device 165 is not material to the scope of the invention.

Figure 2B:
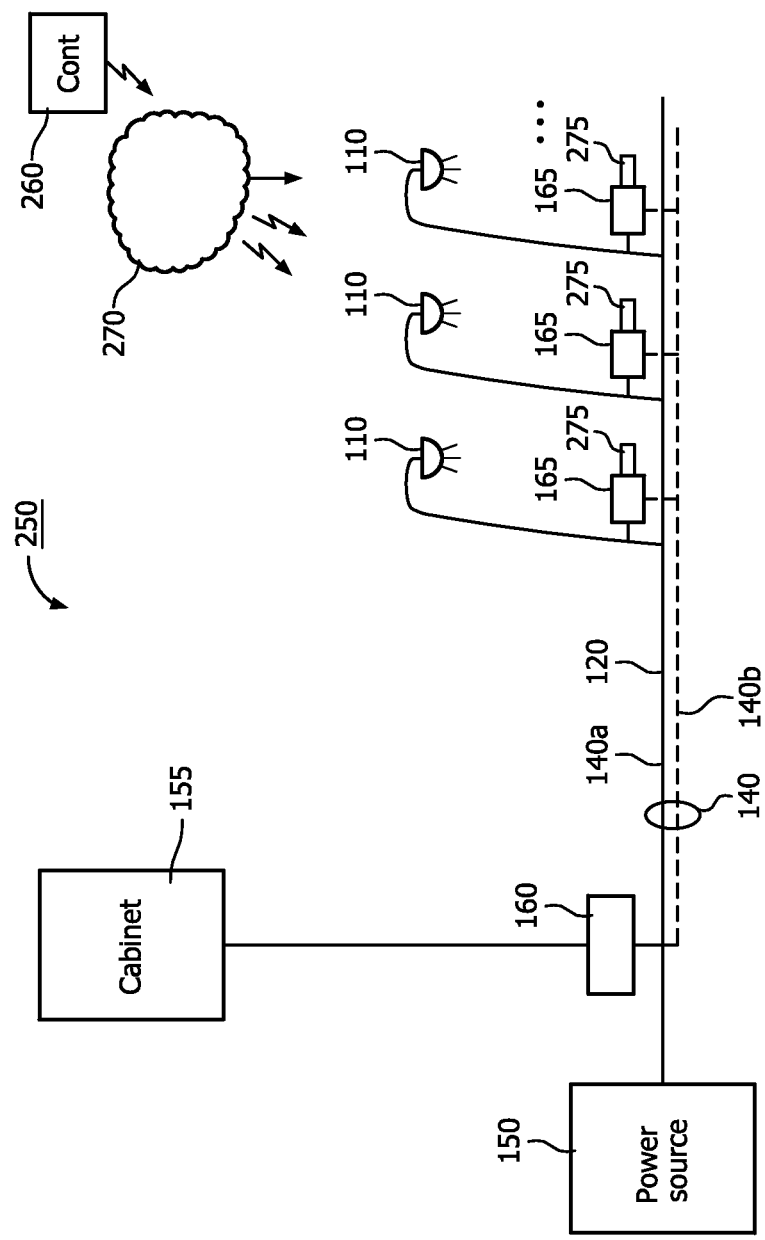
FIG. 2B represents another exemplary illumination system configuration in accordance with the principles of the invention.

FIG. 2B illustrates another exemplary network configuration 250 in accordance with the principles of the invention. In this exemplary network, the luminaries 110 are connected through the power grid 120 (to supply power to the luminaires) and primary communication network 140, as previously discussed, and operate as discussed with regard to FIG. 1. In addition, alternative network 270 provides an alternative communication and control path.

In the illustrated example, the alternative network 270 may be a wireless network that operates independent of the power grid 120 and primary communication network The wireless alternative network 270 may be a dedicated network or a public network provides control signals to each luminaire 110 and may operate using one or more well-well-known communication protocols (e.g., IEEE 802.15.4, WIFI, Cellphones technology, 2G, 3G. 4G, etc.).

In this illustrative example, interface 165 includes a receiving system 275 that receives signals transmitted over the wireless network 270. Interface 165 then operates on control signals (information) received from either the primary communication network 140 or the alternative wireless network 270. The control signals may be provided to the wireless network 270 by a demand access device 260. The demand access device 260 may provide control signals in case a fault is determined to exist in the primary network 140 or when a lighting condition is desired that is not provided by the electronic cabinet 155 at the desired time or place. The demand access device may be one of a special purpose device that operates with a dedicated communication protocol, or may be a general purpose device (e.g., a cellular telephone) that operates using well-known publicly available protocols. For example, the general purpose device may transmit messages that identify one or more luminaries 110 to operate in a desired fashion (e.g., lighting level).

As would be appreciated, the luminaries 110 may be individually identified as network elements using well-known identification methods and respond to commands provide through the auxiliary network(s) (220, 270). The identification of the luminaries with regard to the auxiliary network(s) 220, 270, may or may not be the same as the identification of the luminaries 110 with regard to the primary communication network.

In this illustrated example shown in FIG. 2B, interface device 165 monitors both the primary network 140 and the auxiliary network 270 to determine whether control signals are present on either network (140, 270) to control the operation of the corresponding luminaire 110.

In one aspect of the invention, the receiving system 275, included in the interface 165 of the corresponding luminaire 110, is of a low energy consumption type that may be integrated into the existing interface device 165 or may be separated from the interface device 165. As the receiving system 275 is of a low energy consumption type, the receiving system 275 may be powered by the existing luminaire power grid (i.e., mains) 120 or other means (e.g., solar cells).

In one aspect of the invention, wireless alternative communication network 270 may be a local area network (LAN) or a wide area network (WAN) that may be public or private.

In one aspect of the invention, the interface device 165 may operate such that a detection of a change in a known voltage range (e.g., 0-10 volts) may be used to determine a dimming level. For example, detecting a control signal of magnitude 5 volts implies a dimming level of fifty (50) per-cent, while a control signal of 10 volts represents a full turn on. The interface device 165 may then provide an appropriate change in lighting command to the corresponding luminaire to produce the desired lighting effect. Thus, the light level of a corresponding luminary may be set from a minimum to a maximum light level dependent upon a sensed voltage level or change in voltage level.

In another aspect of the invention, the receiving system may include a DALI (Digital Addressable Lighting Interface) interface that receives a specific dimming control command and provides the command to a luminaire driving circuitry. The luminaire driving circuitry may execute an application (or a logical set of instructions) in response to the received command. DALI is a well-known interface that need not be discussed in detail herein. DALI interfaces may be used in indoor lighting system networks.

In another aspect of the invention, the receiving system may determine changes in modulation and/or signal type to control operation of the luminaries 110. For example, if Pulse Width Modulation (PWM) coded signals are used as control signals, then changes in the signal pulse width, for example, may cause different levels of dimming or element control to occur.

Figure 3A:
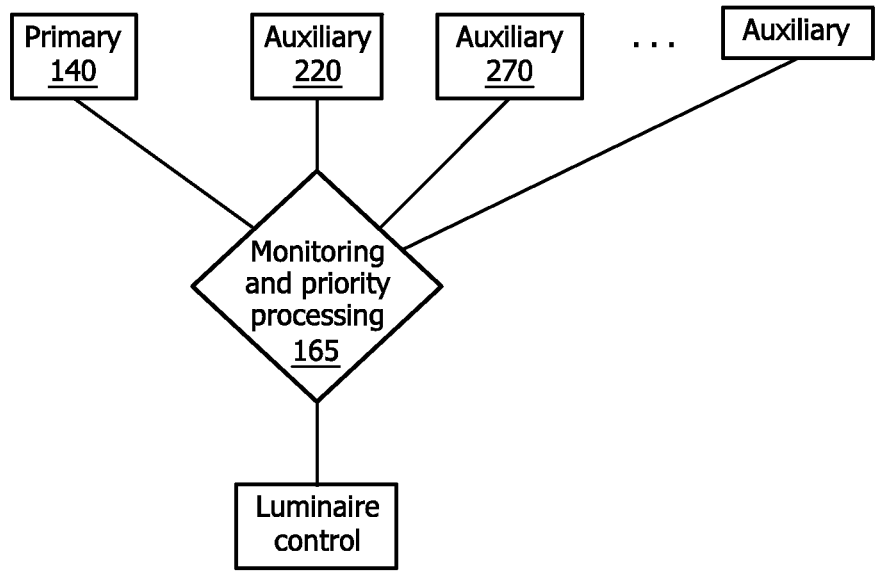
FIG. 3A represents an exemplary implementation for providing control of the luminaries in an illumination system in accordance with the principles of the invention.

FIG. 3A illustrates an exemplary representation of the processing for managing elements of a network in accordance with the principles of the invention. In this exemplary processing, interface device 165, corresponding to each of the luminaries fixtures, network elements) monitors one or more communication networks; in this case a primary network 140 and at least one auxiliary network (220, 270). The primary communication network is similar to network 140 and the auxiliary networks are similar networks 220 and 270, previously discussed. As would be appreciated by those skilled the art, interface 165 may include software and hardware elements that provide for detecting commands on one or more communication networks that may operate on different medium (e.g., wire-ed, wireless) and different protocols (e.g., IEEE 802.11).

Upon receiving a command from at least one of the networks, then processing within interface device 165 determines a priority of the received commands from the corresponding networks and initiates a decision process regarding the received command.

After the priority processing associated with the received command is processed, an output is transmitted to the corresponding network element (luminaire) to operate the luminaire in conformance with the received command.

Priority settings in interface device 165 may be set by the user depending the user's desired lighting requirements. For example, a user may set priorities such that a command from an auxiliary network has a higher priority than a command received from the primary network. Thus, when commands are received concurrently over the primary and an auxiliary network, interface device 165 may operate to execute the command associated with the auxiliary network over the command received from the primary network. Similarly, the priority settings may be such that the command received from an auxiliary network may be maintained for at least a predetermined period of time. In this case, a command received from a primary network (based on time, for example) may be ignored if received within the predetermined period of time after a command received from the auxiliary network.

Figure 3B:
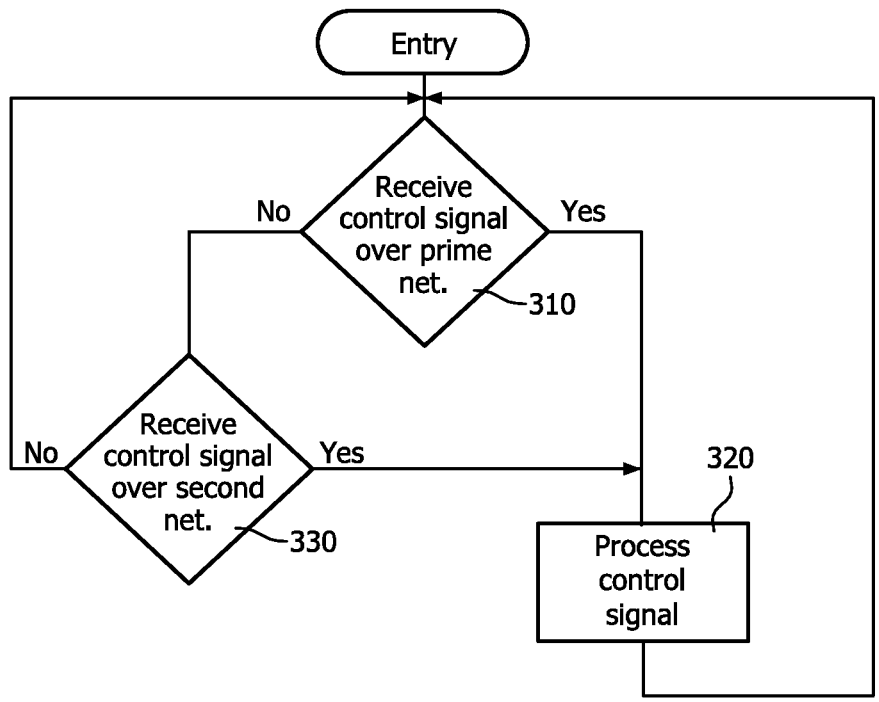
FIG. 3B represents an exemplary method for providing control of the luminaries in an illumination system in accordance with the principles of the invention.

FIG. 3B illustrates an exemplary process for managing elements of a network in accordance with the principles of the invention. In this exemplary process, an electronic interface device 165 associated with a corresponding network element (e.g., luminaire) monitors the primary communication network 140 to determine whether a command has been received. The command may be a signal provided over the primary communication network at block 310. The command may be determined by monitoring a signal line of the primary communication network 140 for the presence of a signal, a change in a status of an existing signal or by the generation of an interrupt that causes the electronic device 165 to determine that a change in the status of a signal line has occurred. In response to the detected command (signal or change in the signal), the electronic device 165 executes an application that operates to control a change the status of the luminaire (e.g., turn on, turn off, dim, etc.) according to the detected signal (or change in the signal) at block 320.

However, if no command is detected to exist on the primary communication network, then at block 330, the electronic interface device 165 determines whether a command (i.e., a signal or a change in signal) has been received over an alternative (secondary) network. This command may be determined by monitoring a signal line for a presence of a signal, a change in a status of an existing signal or by the generation of an interrupt that causes the electronic control device to process a change in the status of a signal line. In response to the detected command (i.e., signal or change in signal status), the electronic interface device 165 executes an application (or causes the execution of an application) that operates to alter the status of the network element (e.g., luminaire), appropriately (e.g., turn on, turn off, dim, etc.) at block 340.

Processing then proceeds to block 310 to continue monitoring the primary network.

Figure 4:
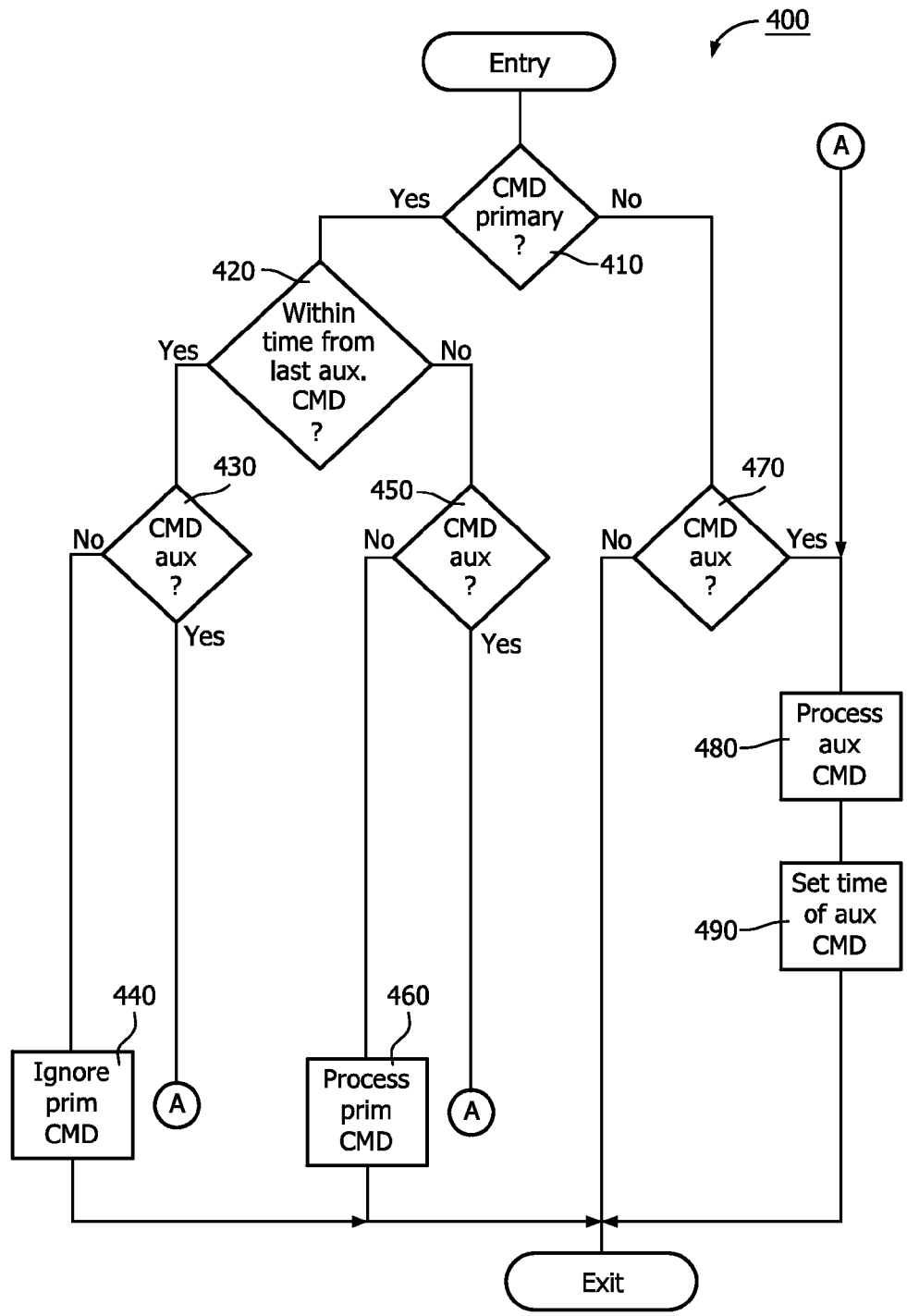
FIG. 4 represents a second exemplary method for providing control of the luminaries in an illumination system in accordance with the principles of the invention.

FIG. 4 illustrates a second exemplary embodiment of processing 400 in accordance with the principles of the invention. In this exemplary embodiment, a determination is made at block 410 whether a command has been received from the primary network. If a command has been received, then a determination is made whether the command from the primary network has been received within a predetermined time from a previous command received on an auxiliary network at block 420. If the command received on the primary network has been received within a predetermined time from the last command received from an auxiliary command, then a determination is made whether a command has been received on an auxiliary network at block 430. If no command from an auxiliary has been received, then the primary command is ignored at block 440. However, if a command from an auxiliary network has been received at block 430, then processing of the auxiliary command is performed at block 480 and the time of receiving the command from the auxiliary network is stored at block 490.

Returning to block 420, if the command from the primary network is determined to be received at a time greater than the predetermined time from the last auxiliary command then a determination is made whether a command from an auxiliary network has also been received. If a command from the auxiliary device has not been received, then the command from the primary network is processed at block 460. However, if a command from an auxiliary network has been received, then processing of the command from the auxiliary network is performed at block 480, as previously described.

Returning to block 410, if a command on the primary network has not been received, a determination is made whether a command has been received over an auxiliary network at block 470. If a command from an auxiliary network has not been received, the processing exits. However, if a command from an auxiliary network has been received, then processing of the auxiliary network command is performed at block 480.

As would be appreciated, the predetermined time may be set by the user during the priority settings or may be set according to the type of command received on the auxiliary network.

The above-described methods according to the present invention can be implemented in hardware, firmware or as software or computer code that can be stored in recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in software that is stored on the recording medium using a general purpose computer(s), or a special processor(s) or in programmable or dedicated hardware(s), such as an ASIC or FPGA. As would be understood in the art, the computer(s), the processor(s), microprocessor controller(s) or the programmable hardware(s) include memory components, e.g., RAM, ROM, Flash, etc. that may store or receive software or computer code that when accessed and executed by the computer(s), processor(s) or hardware(s) implement the processing methods described herein. In addition, it would be recognized that when a general purpose computer(s) accesses code for implementing the processing shown herein, the execution of the code transforms the general purpose computer(s) into special purpose computer(s) for executing the processing shown herein.

Although the present invention has been described with regard to controlling luminaries 110 in either an outdoor lighting system or an indoor lighting system, it would be recognized that the principles of the invention may also be applied to other types of lighting networks that use a centralized control scheme for managing elements of the network. For example, a traffic system may be controlled centrally to manage elements (i.e., signal lights) within the system using a primary communication system. In accordance with the principles of the invention, an alternative communication system may be incorporated into the traffic system to provide for demand response management of selected elements in the traffic control system or as a backup when the primary communication system is unavailable.

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for controlling a luminaire of an illumination network comprising a plurality of luminaires, said method comprising:
   monitoring a primary communication system;
   monitoring an alternative communication system;
   receiving a command from at least one of: the primary communication system and the alternative communication system;
   prioritizing the received commands; and
   executing an application in response to the prioritized received command, said application controlling the operations of the network luminaire, wherein the primary communication network and the alternative communication network are independent.

2. The method according to claim 1, wherein said command is selected from the group consisting of: a signal and a change in an existing signal.

3. The method according to claim 1 further comprising;
   providing power to the luminaire of the network through a power network.

4. The method according to claim 3 wherein the primary communication network is incorporated into said power network.

5. The method according to claim 1, wherein each of the primary communication network and the alternative communication network are selected from a group consisting of: a wire-ed network and a wireless network.

6. The method according to claim 5, wherein the wire-ed network is selected from a group consisting of a: public network and a private network.

7. A device for controlling a luminaire of an illumination network comprising a plurality of luminaires, said device comprising:
   at least one processor in communication with a memory, the memory including code which when accessed by the at least one processor, causes the at least one processor to:
   monitor a primary communication network;
   monitor an alternative communication network;
   receive a command from at least one of: the primary communication system and the alternative communication system;
   prioritize the received commands; and
   execute an application in response to the prioritized received command, said application controlling the operations of the network luminaire, wherein the primary communication network and the alternative communication network are independent.

8. The device according to claim 7, further comprising:
   a receiving system receiving said command.

9. The device according to claim 7, wherein each of the primary communication network and the alternative communication network are selected from a group consisting of: a wire-ed network and a wireless network.

10. The device according to claim 9, wherein the wire-ed network is selected from a group consisting of a: public network and a private network.

11. A device for controlling an output of a Luminaire in a lighting network, the device comprising:
    means for receiving a command from at least one of: a primary communication network and an alternative communication network,
    means for prioritizing the received commands; and
    means for executing an application in response to the prioritized command, said application controlling an output of the luminaire, wherein the primary communication network and the alternative communication network are independent.

12. The device of claim 11, wherein said command comprises one of: a signal and a change in an existing signal.

13. The device of claim 11, wherein said command is a pulse width modulated signal.

14. The device of claim 11, wherein said primary communication network and alternative network is selected from one of: a wire-ed network and a wireless network.

15. The device of claim 11, wherein said lighting system is one of: an outdoor lighting system and an indoor lighting system.

\* \* \* \* \*